(12) United States Patent
Koelle et al.

(10) Patent No.: US 7,150,045 B2
(45) Date of Patent: Dec. 12, 2006

(54) METHOD AND APPARATUS FOR PROTECTION OF ELECTRONIC MEDIA

(75) Inventors: Katharina Veronika Koelle, Ann Arbor, MI (US); William P. Worzel, Milan, MI (US)

(73) Assignee: Widevine Technologies, Inc., Seattle, WA (US)

( * ) Notice: Subject to any disclaimer, the term of this patent is extended or adjusted under 35 U.S.C. 154(b) by 861 days.

(21) Appl. No.: 10/020,524

(22) Filed: Dec. 14, 2001
(Under 37 CFR 1.47)

(65) Prior Publication Data

US 2002/0164023 A1 Nov. 7, 2002

Related U.S. Application Data

(60) Provisional application No. 60/255,851, filed on Dec. 14, 2000.

(51) Int. Cl.
*H04L 9/00* (2006.01)
(52) U.S. Cl. .................. 726/26; 713/193; 380/201; 705/51; 726/29; 726/32; 726/22; 709/203; 709/205
(58) Field of Classification Search .................. None
See application file for complete search history.

(56) References Cited

U.S. PATENT DOCUMENTS

| | | | |
|---|---|---|---|
| 4,694,489 A | 9/1987 | Frederiksen | |
| 5,067,035 A | 11/1991 | Kudelski et al. | |
| 5,134,656 A | 7/1992 | Kudelski | |
| 5,144,663 A | 9/1992 | Kudelski et al. | |
| 5,375,168 A | 12/1994 | Kudelski | |
| 5,539,450 A | 7/1996 | Kudelski et al. | |
| 5,590,200 A | 12/1996 | Nachman et al. | |
| 5,592,212 A | 1/1997 | Handelman | |
| 5,621,799 A | 4/1997 | Katta et al. | |
| 5,640,546 A | 6/1997 | Gopinath et al. | |
| 5,666,412 A | 9/1997 | Handelman et al. | |
| 5,684,876 A | 11/1997 | Pinder et al. | |
| 5,758,257 A | 5/1998 | Herz et al. | |
| 5,774,527 A | 6/1998 | Handelman et al. | |

(Continued)

FOREIGN PATENT DOCUMENTS

EP  658054 B1  6/1995

(Continued)

OTHER PUBLICATIONS

Ghosh, A.K., et al, 'Execution Control Lists: An Approach to Defending Against Newand Unknown Malicious Software', Citigal, 2000, entire document, http://www.cigital.com/papers/download/ISW00.pdf.*

(Continued)

*Primary Examiner*—Nasser Moazzami
*Assistant Examiner*—Ronald Baum
(74) *Attorney, Agent, or Firm*—Darby & Darby PC; Jamie L. Wiegand

(57) ABSTRACT

Described is a system and method for providing protection of media by the detection of unauthorized client behaviors and the communication of the unauthorized client behaviors to augment the invention's detection abilities. A variety of detectors are sent to a client process and the responses are evaluated to detect the presence of an unauthorized software behavior on the client. Unauthorized behaviors include alteration of a client process as well as simultaneously running processes that might enable unauthorized copying of protected media. Communication of unauthorized software behaviors includes sharing of memory detectors among servers on a network, and the sending of memory detectors to other clients to detect previously unseen unauthorized behaviors on the other clients.

28 Claims, 14 Drawing Sheets

U.S. PATENT DOCUMENTS

| | | | |
|---|---|---|---|
| 5,774,546 A | 6/1998 | Handelman et al. | |
| 5,799,089 A | 8/1998 | Kuhn et al. | |
| 5,805,705 A | 9/1998 | Gray et al. | |
| 5,825,879 A | 10/1998 | Davis | 380/5 |
| 5,878,134 A | 3/1999 | Handelman et al. | |
| 5,883,957 A | 3/1999 | Moline et al. | 380/4 |
| 5,892,900 A | 4/1999 | Ginter et al. | |
| 5,910,987 A | 6/1999 | Ginter et al. | |
| 5,915,019 A | 6/1999 | Ginter et al. | |
| 5,917,912 A | 6/1999 | Ginter et al. | |
| 5,920,625 A | 7/1999 | Davies | |
| 5,920,861 A | 7/1999 | Hall et al. | |
| 5,922,208 A | 7/1999 | Demmers | |
| 5,923,666 A | 7/1999 | Gledhill et al. | |
| 5,933,498 A | 8/1999 | Schneck et al. | |
| 5,937,159 A * | 8/1999 | Meyers et al. | 726/20 |
| 5,939,975 A | 8/1999 | Tsuria et al. | |
| 5,943,422 A | 8/1999 | Van Wie et al. | |
| 5,949,876 A | 9/1999 | Ginter et al. | |
| 5,953,005 A | 9/1999 | Liu | 345/302 |
| 5,982,891 A | 11/1999 | Ginter et al. | |
| 6,009,116 A | 12/1999 | Bednarek et al. | |
| 6,009,401 A | 12/1999 | Horstmann | |
| 6,009,525 A | 12/1999 | Horstmann | |
| 6,021,197 A | 2/2000 | von Willich et al. | |
| 6,035,037 A | 3/2000 | Chaney | |
| 6,038,433 A | 3/2000 | Vegt | |
| 6,049,671 A | 4/2000 | Slivka et al. | |
| 6,055,503 A | 4/2000 | Horstmann | |
| 6,073,256 A | 6/2000 | Sesma | |
| 6,112,181 A | 8/2000 | Shear et al. | |
| 6,119,165 A * | 9/2000 | Li et al. | 709/229 |
| 6,138,119 A | 10/2000 | Hall et al. | |
| 6,151,643 A * | 11/2000 | Cheng et al. | 710/36 |
| 6,157,721 A | 12/2000 | Shear et al. | |
| 6,178,242 B1 | 1/2001 | Tsuria | |
| 6,185,683 B1 | 2/2001 | Ginter et al. | |
| 6,189,097 B1 | 2/2001 | Tycksen, Jr. et al. | |
| 6,191,782 B1 | 2/2001 | Mori et al. | |
| 6,192,354 B1 * | 2/2001 | Bigus et al. | 706/46 |
| 6,201,948 B1 * | 3/2001 | Cook et al. | 434/350 |
| 6,226,794 B1 | 5/2001 | Anderson, Jr. et al. | |
| 6,237,786 B1 | 5/2001 | Ginter et al. | |
| 6,240,185 B1 | 5/2001 | Van Wie et al. | |
| 6,247,950 B1 | 6/2001 | Hallam et al. | |
| 6,253,193 B1 | 6/2001 | Ginter et al. | |
| 6,256,668 B1 | 7/2001 | Slivka et al. | |
| 6,272,636 B1 | 8/2001 | Neville et al. | |
| 6,285,985 B1 | 9/2001 | Horstmann | |
| 6,292,569 B1 | 9/2001 | Shear et al. | |
| 6,298,441 B1 | 10/2001 | Handelman et al. | |
| 6,314,409 B1 | 11/2001 | Schneck et al. | |
| 6,314,572 B1 | 11/2001 | LaRocca et al. | |
| 6,330,588 B1 * | 12/2001 | Freeman | 709/202 |
| 6,334,213 B1 | 12/2001 | Li | |
| 6,363,488 B1 | 3/2002 | Ginter et al. | |
| 6,389,402 B1 | 5/2002 | Ginter et al. | |
| 6,405,369 B1 | 6/2002 | Tsuria | |
| 6,409,080 B1 | 6/2002 | Kawagishi | |
| 6,409,089 B1 | 6/2002 | Eskicioglu | |
| 6,427,140 B1 | 7/2002 | Ginter et al. | |
| 6,449,367 B1 | 9/2002 | Van Wie et al. | |
| 6,449,719 B1 | 9/2002 | Baker | |
| 6,459,427 B1 | 10/2002 | Mao et al. | |
| 6,466,670 B1 | 10/2002 | Tsuria et al. | |
| 6,505,299 B1 | 1/2003 | Zeng et al. | |
| 6,587,561 B1 | 7/2003 | Sered et al. | |
| 6,618,484 B1 | 9/2003 | Weber et al. | |
| 6,629,243 B1 | 9/2003 | Kleinman et al. | |
| 6,634,028 B1 | 10/2003 | Handelman | |
| 6,640,304 B1 | 10/2003 | Ginter et al. | |
| 6,651,170 B1 | 11/2003 | Rix | |
| 6,654,420 B1 | 11/2003 | Snook | |
| 6,654,423 B1 | 11/2003 | Jeong et al. | |
| 6,658,568 B1 | 12/2003 | Ginter et al. | |
| 6,668,325 B1 | 12/2003 | Collberg et al. | |
| 6,671,812 B1 * | 12/2003 | Balasubramaniam et al. | 726/22 |
| 2002/0087883 A1 * | 7/2002 | Wohlgemuth et al. | 713/201 |
| 2003/0007568 A1 | 1/2003 | Hamery et al. | |

FOREIGN PATENT DOCUMENTS

| | | |
|---|---|---|
| EP | 714204 B1 | 5/1996 |
| JP | 1 041 823 A2 | 3/1999 |
| WO | WO96/06504 A1 | 2/1996 |
| WO | WO96/32702 A1 | 10/1996 |
| WO | WO 99/30499 A1 | 6/1999 |
| WO | WO99/54453 A1 | 10/1999 |
| WO | WO 01/35571 A1 | 5/2001 |
| WO | WO 02/21761 A2 | 3/2002 |

OTHER PUBLICATIONS

Directed-Graph Epidemiological Models of Computer Viruses, Kephart and White, 1991 IEEE Computer Society Symposium on Research in Security and Privacy, Oakland, California, May 20-22, 1991, pp. 343-359.

Computers and Epidemiology, Kephart, Chess, and White, IEEE Spectrum, May 1993, 15 pages.

A Biologically Inspired Immune System for Computers, Kephart, Artificial Life IV, R. Brooks and P. Maes, eds., 1994, MIT Press, pp. 1-10.

Self-Nonself Discrimination in a Computer, 1994 IEEE Symposium on Research in Security and Privacy, 11 pages.

An Immunological Approach to Change Detection: Algorithms, Analysis and Implications, 1996 IEEE Symposium on Securiyt and Privacy, 10 pages.

A Sense of Self for Unix Processes, Forrest, Hofmeyr, Somayaji, and Longstff, 1996 Symposium on Security and Privacy, Los Alamitos, CA, IEEE Computer Society Press, pp. 120-128.

After 1997, Lightweight Intrusion Detection for Networked Operating Systems, Hofmeyr, Forrest and Somayaji, pp. 1-31.

Principles of a Computer Immune System, Somayaji, Hofmeyr and Forrest, New Security Paradigms Workshop, Langdale, Cumbria, UK, 1997, pp. 75-82.

A Distributed Approach to Anomaly Detection, D'haeseleer, Forrest, and Helman, Draft, Aug. 30, 1997, pp. 1-30.

Blueprint for a Computer Immune System, Kephart, Sorkin, Swimmer and White, Virus Bulletin International Conference in San Francisco, California, Oct. 1-3, 1997, 19 pages.

1999, Architecture for an Artificial Immune Systems, Hofmeyr and Forrest, Evolutionary Computation 7(1):45-68, Massachusetts Institute of Technology, 31 pages.

Immunity by Design: An Artificial Immune System, *Proceedings of the Genetic and Evolutionary Computation Conference (GECCO)*, Morgan-Kaufmann, San Francisco, CA, Hofmeyr, and Forrest, pp. 1289-1296 (1999).

Detecting Intrusions Using System Calls: Alternative Data Models, Warrender, Forrest, and Pearlmutter, 1999 IEEE Symposium on Security and Privacy, May 9-12, 1999, 13 pages.

After 2001, A New Approach for Intrusion Detection, Dasgupta and Gonzalez, pp. 1-12.

http://www.ntt.co.jp/news/news02e/0209/020927.html, Sep. 27, 2002.

Coverage and Generalization in an Artificial Immune System, Balthrop, et al., 2002.

Video Protection by Partial Content Corruption, C. Griwodz, Sep. 1998.

An Overview of Multimedia Content Protection in Consumer Electronics Devices, Eskicioglu et al.

Performance Study of a Selective Encryption Scheme for the Security of Networked, Real-Time Video, Spanos et al., 1995.

Goonatilake, Suran, ed. et al., Intelligent Systems for Finance and Business, 1995, chapters 2-10, pp. 31-173.

Irdeto Access and Optibase create Strategic Alliance—Dec. 14, 2000, http://www.irdetoaccess.com/press/0000041.htm.
System Security, Streaming Media, S. Blumenfeld, Oct. 2001.
http://www.cs.unm.edu/~forest/projects.html, Dec. 2, 2003.
Partial Encryption for Image and Video Communication, H. Cheng, 1998.
A Review of Video Streaming Over the Internet, Hunter et al., Dec. 2, 2003.
Standards Track, Schulzrinne, et al., Apr. 1998, pp. 1-86.
http://www.optibase.com/html/news/December_14_2000.html, Dec. 14, 2004.

Omneon Video Networks Product Announcement, Broadband Streaming, pp. 1-4.
Yoshida, Kazuhiro, et al., "A Continuous-media Communication Method for Minimizing Playback Interruptions", IS&T/SPIE Conference on Visual Communications and Immage Processing, Jan. 1999, San Jose, California, vol. 3653.

* cited by examiner

METHOD AND APPARATUS FOR PROTECTION OF ELECTRONIC MEDIA

RELATED APPLICATIONS

This application claims the benefit of U.S. Provisional Application No. 60/255,851 filed on Dec. 14, 2000, which is hereby claimed under 35 U.S.C. §119(e).

FIELD OF THE INVENTION

The present invention relates to computer readable data storage and more particularly to copy protection and data integrity of computer readable data.

BACKGROUND OF THE INVENTION

There has been much attention focused on the protection of copyrighted computer readable media, including image, audio, and video, through tests on the integrity of the media and the legality of the software with which the media is associated.

Traditional copy protection methods that secure electronic media such as images, audio, and video include a variety of methods such as standard encryption and data marking.

Standard encryption technologies have been used in the protection of electronic media sent over networks. These technologies encrypt a stream of data on the server side and then decrypt the data on the client side, in order to deter the understanding and the stealing of the data by a third party who has access to the network.

The process of "watermarking" electronic media has been another security measure implemented to deter the frequency of illegal media copying. Typically, watermarking tools place transparent and unique identifiers onto visual content and then enable the watermarked images to be more tightly controlled by their creators.

Other copy protection schemes have focused on actively protecting media from unauthorized viewing or copying, in addition to simply labeling the media with ownership and copyright information. Such schemes typically include the use of secure containers for electronic media and some form of encryption.

There has even been an attempt recently to establish a Global Unique Identifier that would allow media providers to link Secure Digital Music Initiative (SDMI) files to a specific computer, and thereby limit a user's ability to copy the files.

Moreover, artificial immune systems (AISs) have been designed to notice malign virus (worm, Trojan horse) entry into a computer or a computer network.

SUMMARY OF THE INVENTION

Briefly stated, the present invention is a system, an article, and a method to detect unauthorized client behaviors and the communication of the unauthorized client behaviors. A variety of detectors are sent to a client process and the responses are evaluated to detect the presence of an unauthorized software behavior on the client. Unauthorized behavior includes alteration of a client process as well as simultaneously running processes that may enable unauthorized copying of the protected electronic media. Communication of unauthorized software behavior includes sharing of detectors among servers on a network, and the sending of detectors to other clients to detect previously unseen unauthorized behaviors on the other clients.

In accordance with one illustrative aspect of the present invention, a method includes sending at least one detector to a client process, receiving a response to the detector from the client process, detecting a presence of an unauthorized software behavior on the client based upon the response, and updating a database of detectors for a previously unseen and unauthorized behavior of the process such that the database evolves over time.

In another illustrative aspect of the present invention, a method includes exchanging sets of memory detectors between servers during an update period, evaluating the received set of memory detectors against a recipient's self database and a set of matching rules, discarding memory detectors in the received set of memory detectors that match a detector in the recipient's self database, and merging the remaining memory detectors with the existing memory database.

In another illustrative aspect of the present invention, a system includes a server to send media to a client; and an application (computer program) to perform actions when executed that include sending a detector to the client, receiving a response to the detector from the client, detecting a presence of an unauthorized process behavior on the client based on the response and a matching rule associated with the detector, and updating a database of detectors for a previously unseen unauthorized process behavior on the client such that the database adapts based on the response.

In still another illustrative aspect of the present invention, a machine readable medium provides instructions which, when executed by at least one processor, cause the processor to perform operations that include sending at least one detector to a client process (or executing program), receiving a response to the detector from the client process, detecting a presence of an unauthorized software behavior on the client based upon the response and a matching rule that is associated with the detector sent; and updating a database of detectors for a previously unseen and unauthorized behavior of the process such that the database adapts the detector based upon the detector response.

Other features and advantages of the present invention will become apparent from the following Detailed Description of the Invention read in conjunction with the accompanying drawings.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified. The order of description in flow diagrams should not be construed as to imply that these operations are necessarily order dependent.

For a better understanding of the present invention, reference will be made to the following Detailed Description of the Invention, which is to be read in association with the accompanying drawings, wherein.

DETAILED DESCRIPTION OF THE INVENTION

Throughout the specification, and in the claims, the term "connected" means a direct electrical connection between the things that are connected, without any intermediary devices. The term "coupled" means either a direct connection between the things that are connected, or an indirect connection through one or more passive or active intermediary devices. The meaning of "a," "an," and "the" include plural references. The meaning of "in" includes "in" and "on." Additionally, a reference to the singular includes a reference to the plural unless otherwise stated or inconsistent with the disclosure.

Briefly stated, the present invention is directed to a method and system of copy protection and data integrity for computer readable media. Protection of computer readable media includes detection of unauthorized software behavior, and communication of the detection of unauthorized software behavior. Unauthorized behaviors include alteration of a client process as well as simultaneously running processes that may enable unauthorized copying of protected media.

Artificial Immune System (AIS) Operational Environment

The present invention has identified that a computer system implemented analogy of a biological system to respond to a foreign body infection, termed herein an Artificial Immune System (AIS), may be employed to monitor software behavior for unauthorized software operations such as copy protection and data integrity. The AIS is premised on the concept that both living entities and computers encounter continuously changing deleterious foreign matter against which they must defend themselves. In the case of living entities, that foreign matter includes viruses, bacteria, and other pathogens that evolve through a process of natural selection. Living entities accomplish this feat by recognizing the "self" (e.g., all the proteins that constitute the living entity) and considering things that fall outside of this category to be potentially harmful. In the case of computers, that foreign matter includes viruses, worms, and Trojan horses that are generated within a computing system and may spread from one computer system to another, leaving a trail that may cause computer system software to be infected and to execute abnormally. In the present invention, a computer system recognizes unauthorized copying and storing of data through the determination of abnormal client process behavior.

Figure 1:
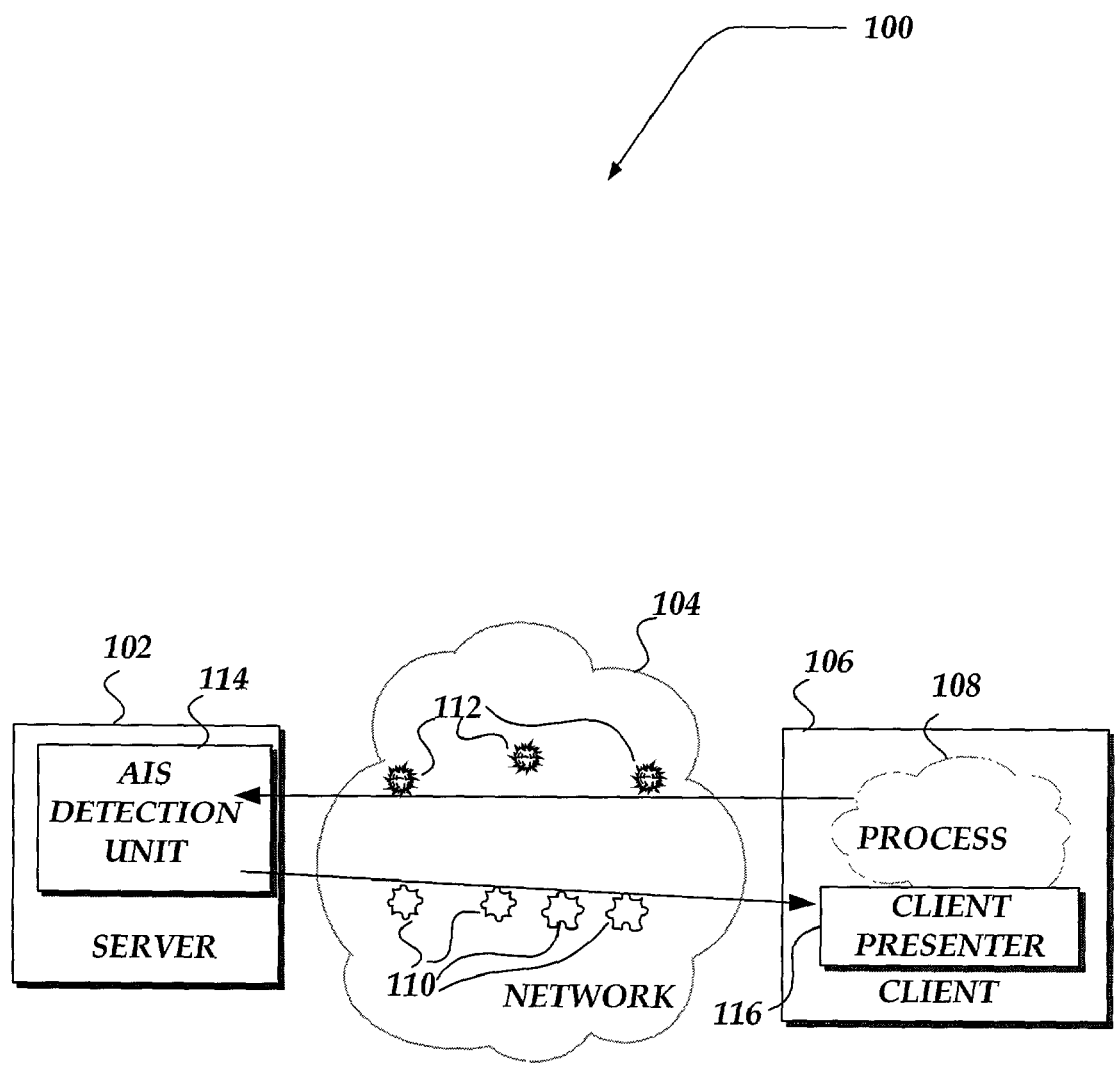
FIG. 1 is a block diagram of an embodiment of the present invention implemented by a server and a client, coupled through a network, to detect unauthorized software execution.

Referring to FIG. 1, server-based detector system 100, includes a server 102, a network 104, a client 106, detector(s) 110, and response(s) 112. Server 102 includes an AIS detection unit 114. Client 106 includes an executing client software process 108, which is to be examined, and client presenter 116.

The server 102 is coupled to network 104 and is described in more detail with reference to FIG. 2 below. Client 106 is also coupled to network 104 and is described in more detail with reference to FIG. 3 below.

In the embodiment portrayed with reference to FIG. 1, network 104 can employ any form of network media for communicating information from one electronic device to another. Also, the network 104 can include the Internet in addition to local area networks (LANs), wide area networks (WANs), direct connections, such as through a universal serial bus (USB) port, forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices might be remotely connected to either LANs or WANs via a modem and temporary telephone link. A remote computer may act in a number of ways, including as an internet (content) server or a client with an application program.

It will be appreciated that network 104 may comprise a vast number of such interconnected networks, computers, and routers. As shown, server 102 and client 106 are in communication through network 104, which provides a path between the executing client software process 108 and the embodiment of the AIS detection unit 114.

Server 102 provides access to information, such as streaming media, and services through network 104 to client 106. While client 106 may be receiving information from server 102, server 102 may also transmit through network 104 a series of detectors 110 to client presenter 116. Client presenter 116 in turn presents detectors 110 to client software process 108 residing on client 106. Client 106 communicates responses 112 to detectors 110 through network 104 for evaluation by AIS detection unit 114. The communication of detectors 110 and responses 112 between client 106 and server 102 may occur without the user's knowledge.

Figure 2:
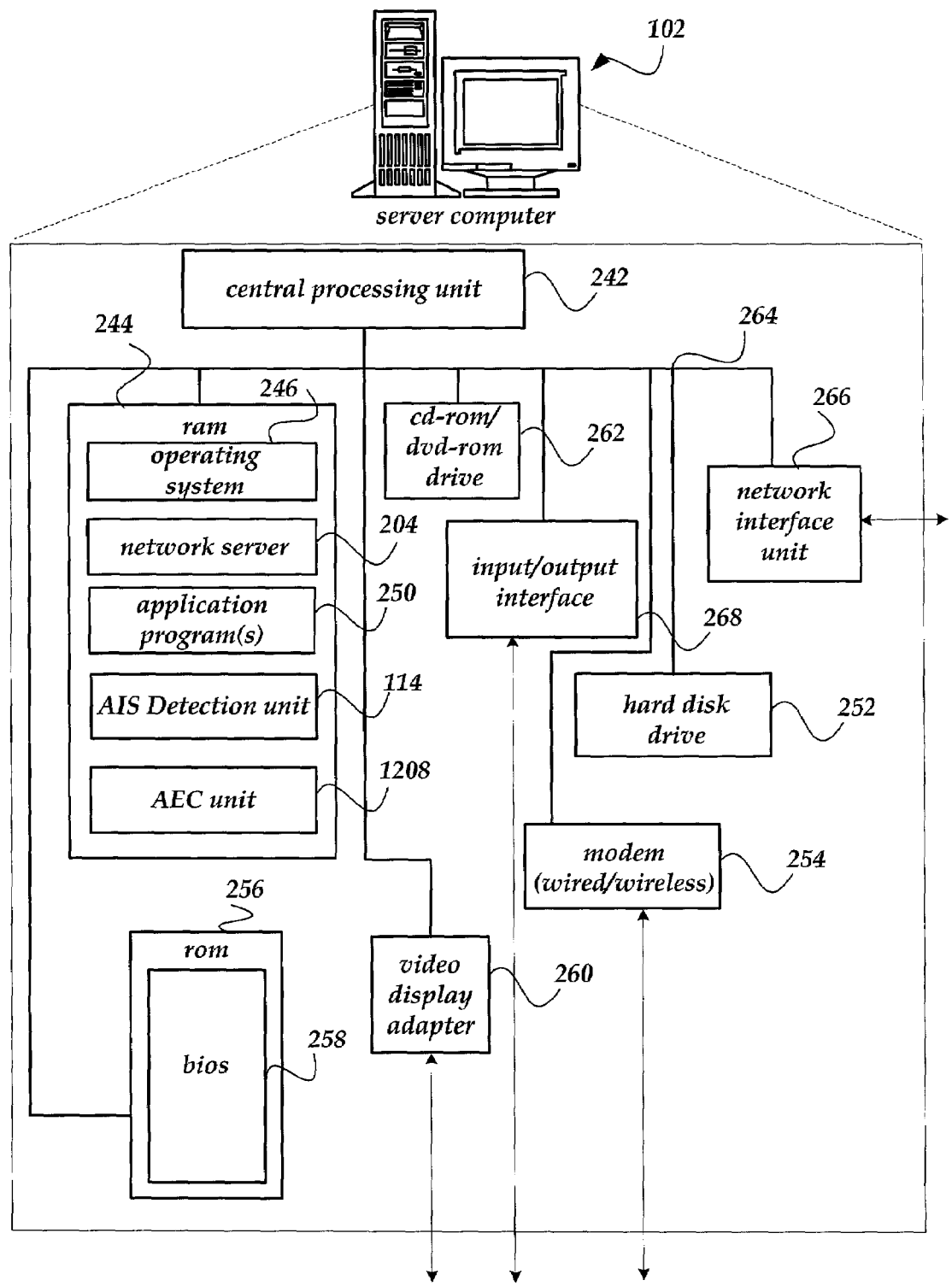
FIG. 2 is a block diagram of an embodiment of a server computer as portrayed in FIG. 1.
Figure 3:
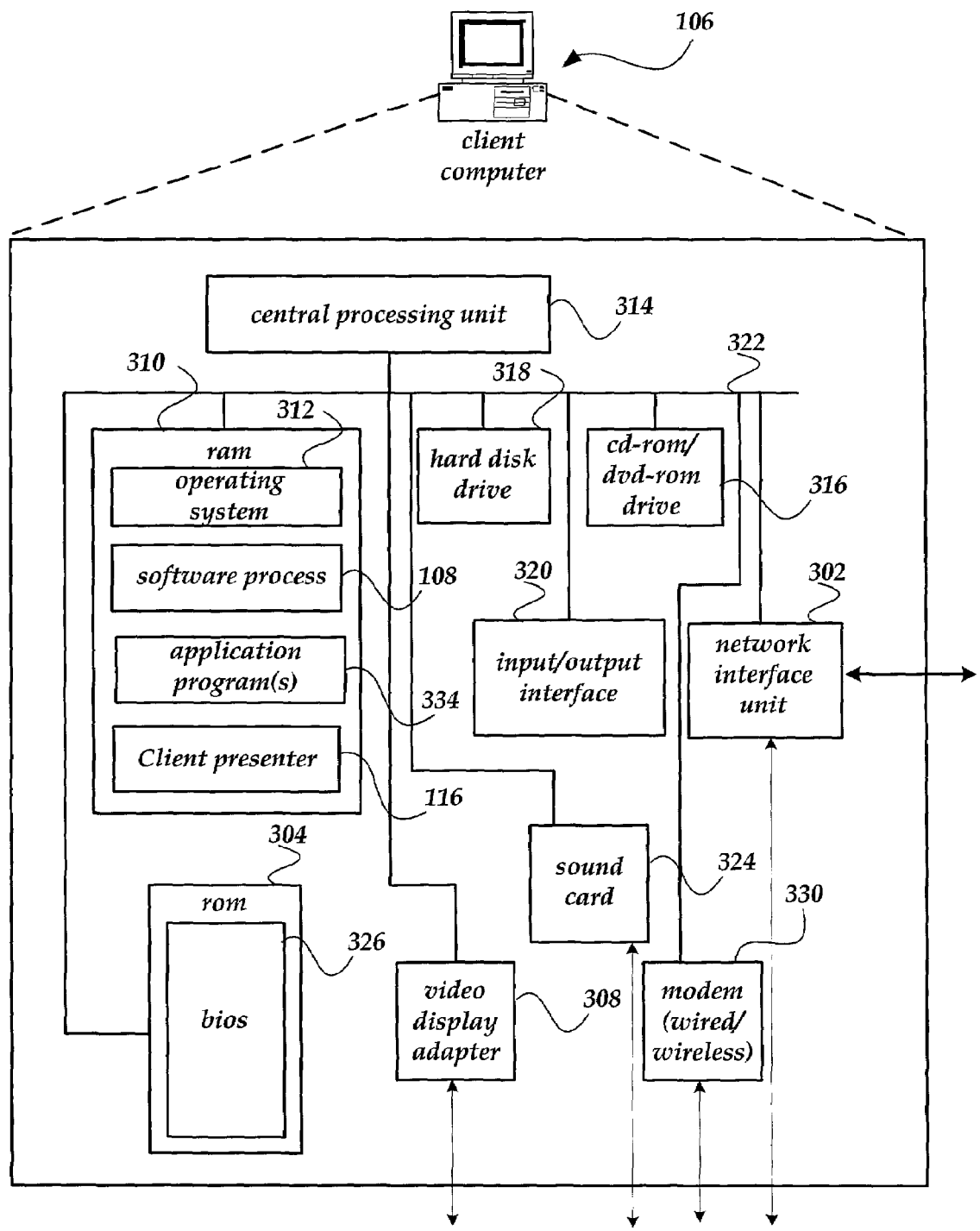
FIG. 3 is a block diagram of an embodiment of a client computer as portrayed in FIG. 1.

Referring to FIG. 2, a server 102 enables the operation of network server 204 on network 104 (FIG. 1) for access by a client, such as client 106. Accordingly, server 102 enables network server 204 to respond to requests for information by a client software process 108, or other application programs 334 (FIG. 3), which are running on client 106 (FIG. 3). For instance, server 102 can stream data, drawings, pictures, figures, graphics, movies, audio files, animations, and the like in response to a request for information. These transactions can take place across a closed or open network, such as the Internet. The server 102 may include many more components than those shown. As illustrated in FIG. 2, server 102 can communicate with a network, via network interface unit 266 for use with and according to, communication protocols such as TCP/IP protocol.

Server 102 in an embodiment includes processing unit 242, video display adapter 260, and a mass memory, all in communication with each other via bus 264. The mass memory generally includes RAM 244, non-volatile memory, such as a ROM 256, and one or more permanent mass storage devices, such as hard disk drive 252, tape drive, optical drive, and/or floppy disk drive. The mass memory stores operating system 246 for controlling the operation of server 102. A general-purpose server operating system may be employed, e.g., UNIX, LINUX, WINDOWS NT®, or the like. Basic input/output system ("BIOS") 258 is also provided for controlling the low-level operation of server 102. The mass memory also stores program code and data for providing a presence on a network. More specifically, the mass memory stores application programs 250, data (not shown), and network server 204. These application programs 250 include computer executable instructions which, when executed by central processing unit 242, generate response messages and perform the logic described elsewhere in this specification. The application programs 250 include programs that perform logical operations. Server 102 may also include a Simple Mail Transfer Protocol (SMTP) handler application (not shown) for transmitting and receiving e-mail, a Hypertext Transfer Protocol (HTTP) handler application for receiving and handing HTTP requests, and an HTTP Over Secure Socket Layer (HTTPS) handler application (not shown) for handling secure connections. Server 102 the embodiment includes input/output interface 268 for communicating with external devices, such as a mouse, keyboard, scanner, and other input devices not shown in FIG. 2. Likewise, server 102 may further include additional mass storage facilities such as CD-ROM/DVD-ROM drive 262 and hard disk drive 252. Hard disk drive 252 is utilized by server 102 to store application programs, databases, and program data used by the network server 204 to be loaded into RAM 244 for execution, and the like. For example, Detector databases (described in more detail below), audio databases, and image databases, and the like may be stored.

Server 102 includes AIS detection unit 114 (as described in an embodiment with reference to FIG. 8) and in an embodiment Artificial Epidemiological Control (AEC) unit 1208 (described with reference to FIG. 12.) Servers that include an AIS detection unit 114 ask questions of, and receive responses from, clients. These questions take the form of "detectors", which are any identifying characteristic of an executing program.

Referring to FIG. 3, client 106 includes network interface unit 302 for connecting to a LAN, VLAN, or WAN, or for connecting remotely to a LAN, VLAN, or WAN. Network interface unit 302 includes necessary circuitry for such a connection, constructed for use with various communication protocols including the TCP/IP protocol, the particular network configuration of the LAN, VLAN, or WAN it is connecting to, and a particular type of coupling medium. Network interface unit 302 may also be capable of connecting to the Internet through a point-to-point protocol (PPP) connection or a Serial Line Internet protocol (SLIP).

Additionally, modem 330 is in communication with central processing unit 314 via bus 322 and enables server 102 to place a call to or receive a call from a telephone number. Modem 330 may be a wired and/or wireless telephonic device capable of transmitting voice and/or data.

Client 106 includes BIOS 326, central processing unit 314, video display adapter 308, and memory. The memory generally includes random access memory (RAM) 310, read-only memory (ROM) 304 and a permanent mass storage device, such as disk drive 318. The memory stores operating system 312 and other application programs 334, for controlling the operation of client 106. The memory also includes client software process 108, and client presenter 116 for managing the information provided by server 102 in response to requests by clients 106. The application programs, software processes, and content are stored on a computer-readable medium. Input/output interface 320 may also be provided for receiving input from a mouse, keyboard, or other input device. The memory, network interface unit 302, video display adapter 308, and input/output interface 320, modem 330 are all connected to central processing unit 314 via bus 322. Additionally, modem 330 may be a wired or wireless telephonic device capable of transmitting data and/or voice communications. Other peripherals may also be connected to central processing unit 314 in a similar manner.

Figure 4:
FIG. 4 is a diagram of an embodiment of a detector type.

Referring to FIG. 4, an embodiment of a detector 110 includes an illustrative detector 400. Here the detector 400 consists of a sequence of file system calls generated by an executing program, which can be either exactly or partially matched by a currently executing program's (or process's) audited file system calls, depending upon the given matching executing algorithm (rule).

Referring again to FIG. 1, one or more matching rules (not shown) are associated with detector 110 and are employed in determining how stringent a given sequence of computer system calls must be matched before a match is validated. For example, for a sequence of eight system calls, one possible matching rule is that the sequence matches if any of six of the eight calls is matched, i.e. a detector 110 is sent, and a received response 112 matches. Another possible matching rule is to require the first six system calls in the sequence included within detector 400 to match. A matching rule may be employed that describes a set of possible matches, such as:

OPEN/*/READ/CLOSE/READ/WRITE/*/IOCONTROL where the "*" denotes that the algorithm classifies a match regardless of what system call sequence arises after the "OPEN" and "WRITE" system calls in detector 110.

It will be appreciated by one of ordinary skill in the art that the length of a given sequence of system calls within detector 110 may be any length such as eight. It has been determined that by varying the lengths of a sequence of system calls it may be more difficult to discern the meaning of detector 110, thereby improving the security, and effectiveness of the present invention.

In another embodiment of the present invention, the sequence calls are numerically encoded and combined into a number for transmission to and/or storage on client 106. Encoding the sequence calls is directed at obscuring the meaning of detector 110 further, as the number may have different meanings based on the algorithm employed to encode the sequence, thus making it more difficult for a client side user to determine how the invention functions.

Encoding schemes for the sequence calls may be implemented in a variety of ways depending upon the number of system calls in a given sequence, the format of the detector rules, and the like. For example, a generic hashing function may be employed to encode the system calls within detector 110, without departing from the scope or spirit of the present invention.

Three varieties of detector 110 are illustratively described herein. One variety of detector 110 is a self-detector. A self-detector is a system call fragment that is typically located in a complete self-database, i.e., a database that includes a set of possible sequences of system calls seen in the normal execution of client software process 108. If a common self-detector is employed as a "behavioral question" to client software process 108 running on client 106, client software process 108 is to provide a response that indicates an acknowledgment that the self-detector has been found in its audit log (not shown).

Another variety of detector 110 is a memory detector. A memory detector is a system call sequence that has already been associated with unauthorized software alterations. These detectors are typically taken from an AEC database, and are typically employed to detect recurrent unauthorized software alterations.

Yet another variety of detector 110 is a novel detector. A novel detector is a system call sequence that is a possible behavioral anomaly, but has not previously been seen. They are employed to recognize new unauthorized software alterations.

While three varieties of detector 110 have been described above, the present invention is not so limited. For example, detectors composed of only non-system calls, or a combination of system and non-system calls, and the like, may be employed, without departing from the spirit or scope of the invention.

Operationally, server 102 communicates detector 110 to client 106 over network 104. Positive or negative responses 112 in turn are communicated to server 102, depending on whether the detectors have been matched by the audited system call fragments of client software process 108 on client 106. The AIS detection unit 114 on server 102 evaluates client's responses 112 to determine the authorization status of client's executing software 108.

If server 102 communicates common self-detectors to client 106, AIS detection unit 114 expects to receive a positive response 112 from client 106, thereby confirming the ability of client 106 to respond. By transmitting non-self detectors (i.e., memory or novel detectors), AIS detection unit 114 is enabled to test for illegal behavior of client software process 108. Negative responses to the non-self detectors may be expected of an authorized client software process 108. Positive responses to some non-self, novel detectors may be expected of a client with an unauthorized software alteration that has not yet been documented. Positive responses to some non-self memory detectors may be expected in the case of a client that is executing an unauthorized software alteration documented in the memory database (not shown). Because a client is unlikely to know a priori whether a given detector 110 should receive a positive or a negative response, an attempt by a user to alter a client to return a positive or a negative response without authorization is likely to fail, thus increasing the security of server-based detector system 100.

Figure 5:
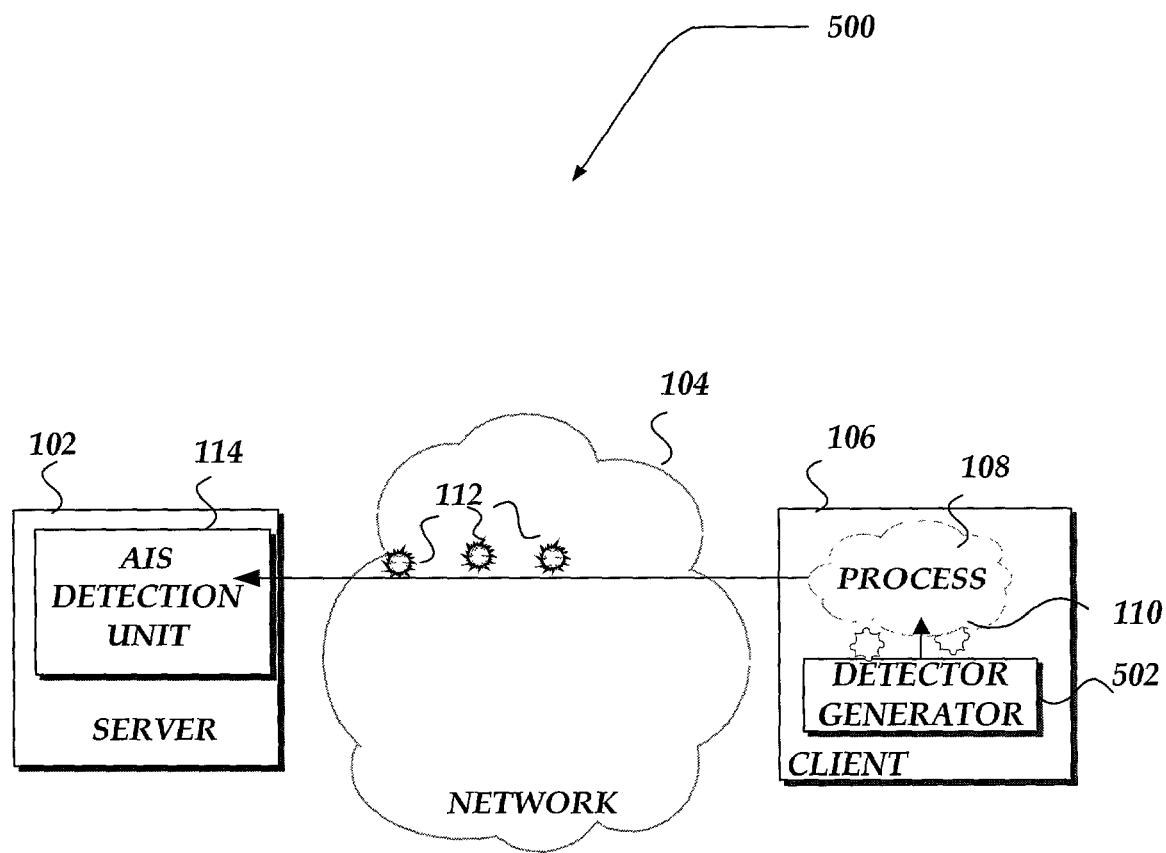
FIG. 5 is a block diagram of an embodiment of the present invention implemented by a server and a client, coupled through a network, in which the client includes a detector generator.

Referring to FIG. 5, the client-side detector generation system 500 includes client detector generator 502. Client detector generator 502 is in operation executing a program within client 106 that is coupled to, and communicates with client's software process 108, or it may be a component of the client's software process 108. The operating environment shown in FIG. 5 operates in substantially the same manner as the operating environment shown in FIG. 1, except that client detector generator 502 provides "behavioral questions" in the form of self and non-self (i.e., novel and memory) detectors to client executing program 108. Responses 112 from client executing program 108 are communicated through network 104 to AIS detection unit 114.

Figure 6:
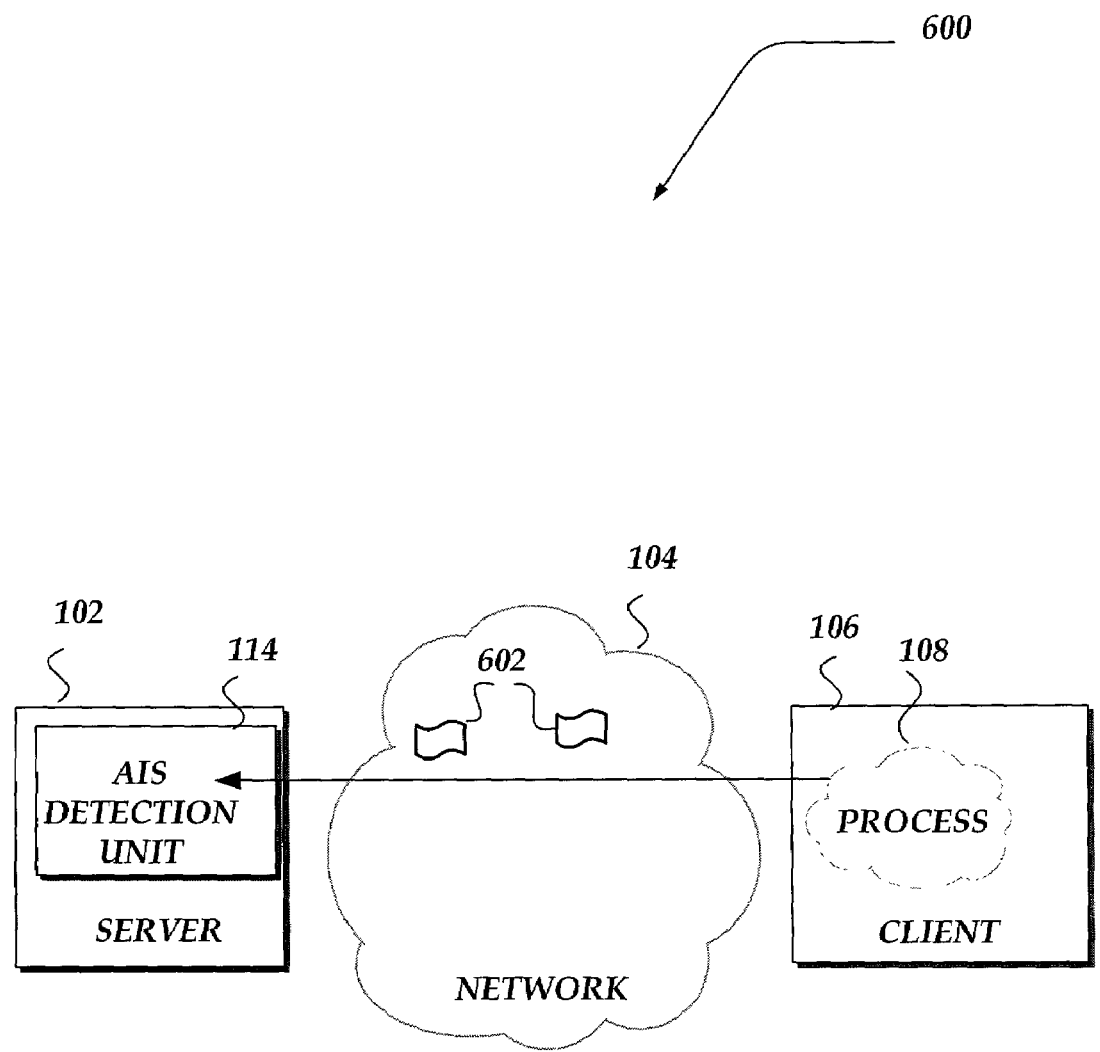
FIG. 6 is a block diagram of an embodiment of the present invention implemented by a server and a client, coupled through a network, having a client generation of audited system calls.

Referring now to FIG. 6, sequences of audited system calls 602 are communicated through network 104 to AIS detection unit 114. Audited system calls 602 are compared against a client software process self-database (not shown) included in AIS detection unit 114 to determine if a significant portion of client software execution behavior is abnormal. Audited system calls 602 are transmitted to server 102 by client's software process 108 or by a separate watchdog process (not shown).

It will be apparent to those skilled in the art, that the present invention as portrayed with respect to FIG. 1, FIG. 5, and FIG. 6, is not limited to a network connection and server implementation. For example, if detectors 110 are retained on client 106, then the fidelity of client's software process 108 may be determined without the presence of network 104 and server 102. For example, a separate process substantially similar to AIS detection unit 114 in execution may co-exist on client 106 for evaluating responses to detectors, without departing from the spirit or scope of the invention.

Referring now to both FIG. 1 and FIG. 5 again, in operation the detectors 110 are transmitted to client's software process 108 to detect possible illegal software alterations. In FIG. 1, AIS detection unit 114 transmits the three types of detectors 110 described above, whereas in FIG. 5, client detector generator 502 transmits detectors 110 to client's software process 108. In each embodiment, detector 110 responds either to positive matches or to both positive and negative matches. Response 112 is bounded by a specified time window within which a matching response is permitted to occur.

In another embodiment of the present invention, detectors 110 are provided with a life span or length of time that detector 110 is considered active. By employing a life span for detectors 110, an efficiency of usage is provided, such that a predetermined number of detectors are active at any given time. This is directed at reducing the processing time to evaluate the set of currently active detectors.

It will be apparent to one skilled in the art, that the determination of the detector death rate may be implemented in a variety of approaches. For example, the death rate of a given detector could be a simple timer, or a function of the number of client responses transmitted, the number of memory detectors already on server 102, the number of positive client responses, the number of audited system calls, or the like, without departing from the scope or spirit of the invention.

Simultaneous Process Detection

Securing media from copy by a client software process that may be directly involved in the display and control of media has been described. For example, with a video file that is streamed from server 102 to client 106, a user may use a media player software program as client software process 108 to present the video stream. As client software process 108, the media player is tested for unauthorized alterations using the AIS detection unit 114 as described above. However, other software processes could compromise the security of the video stream once the stream reaches client 106. For example, software processes that access content directly from the screen buffer and load that content into a file ("screen scrapers") could be used to impermissibly copy the displayed video.

To protect against such attacks, the present invention employs an AIS detection unit substantially similar to the one described above. In addition, the present invention also employs detectors that are substantially similar to detector 400. However, these new detectors include additional information directed at detecting predetermined processes that are running virtually at the same time, thus essentially eliminating the screen scraper problem described in the streaming video example.

It will be appreciated by those of ordinary skill in the art, that the invention is not limited to screen scrapers. For example, other virtually simultaneously running software processes that access sound data passed to a sound driver in a client ("speaker suckers") may also be detected by the present invention.

Figure 7:
FIG. 7 is a diagram of an embodiment of a detector type with process data identity fragments.

Referring now to FIG. 7, an embodiment of a detector 700 as an instance of a detector 110 includes a sequence of file system calls that are substantially similar to the system calls of the detector 400 shown with reference to FIG. 4. The detector 700 may be classified as one of the varieties described above (i.e., memory, self, novel). The detector 700 however, includes an additional data field comprising data to specify the media associated with the file system calls. By employing detector 700, the AIS is enabled to determine whether a virtually simultaneously running process is accessing the media to be protected, thus improving detection of potential unauthorized execution and replication.

Artificial Epidemiological Control (AEC) Operational Environment

Unauthorized software alterations may be passed along or even be mass distributed by users and clients, compromising the security of the media and their stored programs and data on a large scale. Therefore, to augment the efficacy of the AIS of the present invention described above, an embodiment of the present invention includes an Artificial Epidemiological Control (AEC) component. The AEC component is directed at adaptively responding to widespread unauthorized client behavior by generating memory detectors of unauthorized client behaviors, and sharing information about the unauthorized client behaviors among other servers.

Because a server will typically distribute media to many different clients, the AEC component is enabled to obtain information about previously encountered unauthorized software use from many different clients. With a working memory, virtually identical or substantially similar unauthorized software alterations on one client may be more efficiently detected on other clients.

Figure 8:
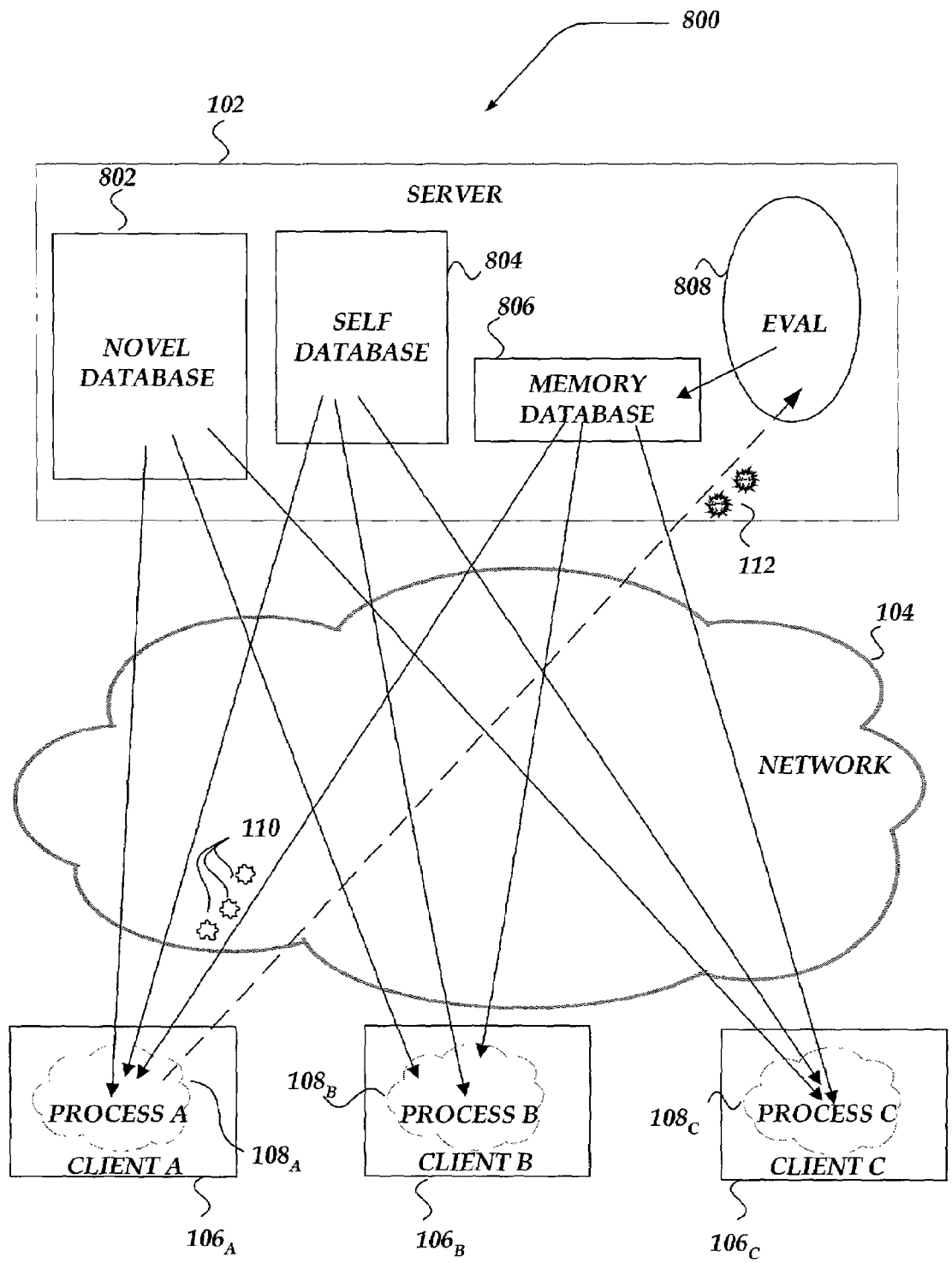
FIG. 8 is a block diagram illustrating an embodiment of Artificial Epidemiological Control (AEC) component.

Referring now to FIG. 8, system 800 includes server 102, network 104, and clients 106$_{A-C}$. Clients 106$_{A-C}$ include software processes 108$_{A-C}$ for which the integrity is to be determined. Software processes 108$_{A-C}$ are substantially similar to client software process 108 described above. Additionally, clients 106$_{A-C}$ are each substantially similar to client 106 described above with reference to FIG. 3. Server 102 includes novel database 802, self-fragment database 804, memory fragment database 806, and evaluator 808.

Novel database 802, self-fragment detector database 804, and memory fragment detector database 806 are coupled to, and in communication with, client software processes 108$_{A-C}$, to provide a series of detectors 110. Client software processes 106$_{A-C}$ are coupled to evaluator 808 through network 104 and are enabled to provide a series of response(s) 112 to evaluator 808.

To increase the effectiveness of detection of unauthorized activity of software processes 108$_{A-C}$, memory fragment database 806 includes storage of identified unauthorized software behaviors and alterations. The storage of the information about unauthorized software alterations and behaviors is typically in the form of memory detector 110. Memory detector 110 may be stored in a cluster or grouping based on at least one criterion, such as their tendency to occur together if an illegal process is copied from one client to another client.

In operation, the AIS detection unit 114 transmits a mix of self-detectors, novel detectors, and memory detectors through network 104 to client 108$_A$ (or 108$_{B\ or\ C}$). Client software process 108$_A$ may provide response 112 that includes a previously unseen unauthorized software alteration or behavior. Response 112 is transmitted to evaluator 808 through network 104, where evaluator 808 determines whether there is an inappropriate client response 112 to detector 110.

Evaluator 808 groups the inappropriate responses together into a memory (not shown) and merges the memory into memory fragment database 806.

The added memory detectors are subsequently sent to other clients 106$_{B-C}$ that are in communication with server 102. In this manner, substantially identical or similar software alterations and behaviors are rapidly detected throughout clients 106$_{A-C}$.

AEC system 800 with its memory fragment database 806 enables the enhanced classification and detection of previously encountered unauthorized software alterations, behaviors, and unauthorized software use more quickly and more thoroughly than systems without such arrangements. This strengthening of the AIS system described above is a result of sending clients 106$_{A-C}$ many groups or clusters of memory detectors 110 from the memory fragment database 806, self-fragment detector database 804, and memory fragment detector database 806.

Moreover, when memory detector 110 is matched, the potentially unauthorized client 106$_{A,\ B,\ or\ C}$ may be sent additional memory detectors 110 associated with originally transmitted memory detector 110.

Client response(s) 112 to additional memory detectors 110 or novel detectors 110 provide for the classification of client 106$_{A-C}$ into one of three potential classes. The first class is based on a previously encountered unauthorized client software process 108$_{A-C}$ behavior. The second class of client response(s) 112 is based on newly-discovered unauthorized client software process 108$_{A-C}$ use, alteration, or behavior. The third class of client response(s) 112 is for clients that may have demonstrated a short anomalous behavior that has been observed for an unknown reason, or has not demonstrated itself through its responses as an authorized client.

When client response 112 is of the first response class, the presence of positive responses to memory detector 110 is noted. The occurrence frequency of memory detector groupings is augmented or increased in the memory fragment database 806. The frequency tabulations are retained to provide increased emphasis to unauthorized activities that are more commonly used or appear to be spreading rapidly.

When client response 112 is of the second response class, a memory detector grouping is generated, with new memory detector associations and potentially new detectors. When client response 112 is of the third response class, a memory detector match may be considered to have provided insufficient for the determination of unauthorized client-side behavior.

AIS/AEC Detection Processes

Figure 9:
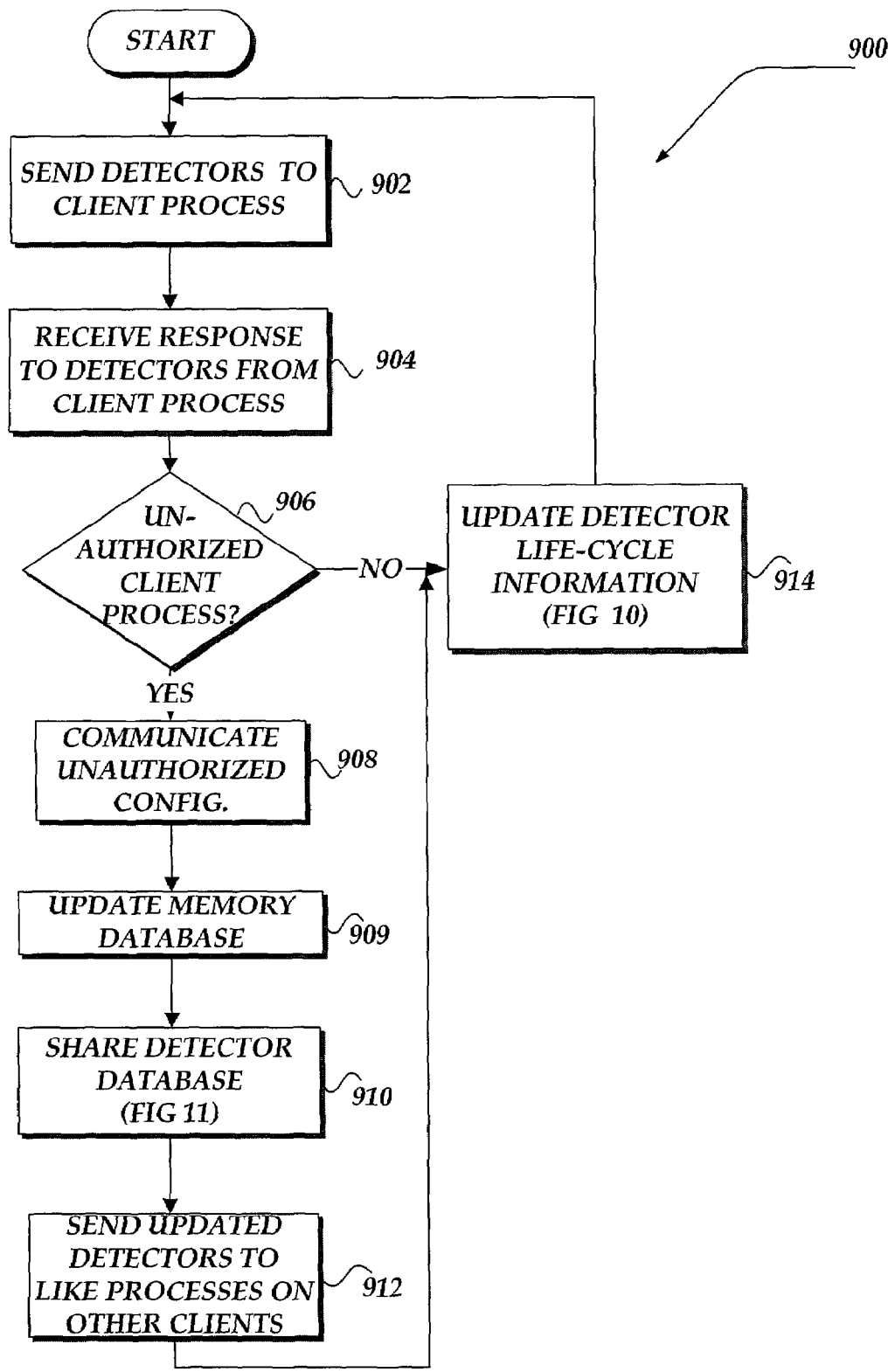
FIG. 9 is a flow diagram of an embodiment of an Artificial Immune System (AIS) process.

Referring to FIG. 9, the AIS/AEC Detection process 900 is employed to detect unauthorized behavior of a client's process, and to share information about unauthorized behavior with other substantially similar processes. The AIS and AEC Detection process 900 begins, after a start block, at block 902 where detectors are sent to a client process. The detectors are typically sent to the client process in response to a request for protected electronic media by the client. While the client process is accessing the protected electronic media, a mix of self-detectors, novel detectors, and memory detectors are also sent to the client process. The mix of detectors may also include detectors to determine whether any simultaneously running processes are attempting to scrape or suck the protected electronic media. Once the detectors are sent to the client process, the process moves to block 904.

At block 904, responses to the sent mix of detectors are received from the client process. As described above, the responses may be in the form of positive or of negative responses, audited system call fragments, and the like. After block 904, the process control advances to decision block 906, where it is determined whether the client process has been altered without authorization, or is attempting to use the protected electronic media in an unauthorized manner, such that an unauthorized client process behavior exists.

At decision block 906, the responses from the client process are evaluated according to at least one of the matching rules that determine the criterion of a response match for determining whether a match is to be considered validated. At decision block 906, if the determination of an unauthorized client process behavior is negative, the process control moves to block 914, where the life-cycle information for the detectors is updated. Block 914 is described below in conjunction with FIG. 10. After block 914, the process returns to block 902, where substantially the same actions discussed herein are performed.

Alternatively, if it is determined at decision block 906 that an unauthorized client process is detected, the process control moves to block 908, where the detection of an unauthorized client process configuration is communicated to signify a potential infringement or unauthorized intrusion of the media. The communication of a potential infringement could result in terminating a transmission of the media to the client, a notifying to appropriate parties of the infringement, terminating the unauthorized client process, and the like. Upon completion of block 908, the process control moves to block 909.

At block 909, the memory database is updated. The process control proceeds to block 910, where detector database information is shared between servers. Block 910 is described in FIG. 11 and the related discussion. Upon completion of the block 910 processing, the logical flow of AIS and AEC process 900 proceeds to block 912.

At block 912, updated detectors are sent to substantially similar client processes on other clients. In this way, other client processes may be examined for identical or substantially similar unauthorized client behavior, thereby more rapidly detecting inappropriate or unauthorized behavior across several client processes. Additionally, at block 912, the original determined unauthorized client process may be sent updated detectors to provide further probing of unauthorized activities or usages of the electronic media.

Upon completion of block 912, the process control moves to block 914, where substantially the same actions discussed above are performed.

Detector Life-Cycle Update Process

Figure 10:
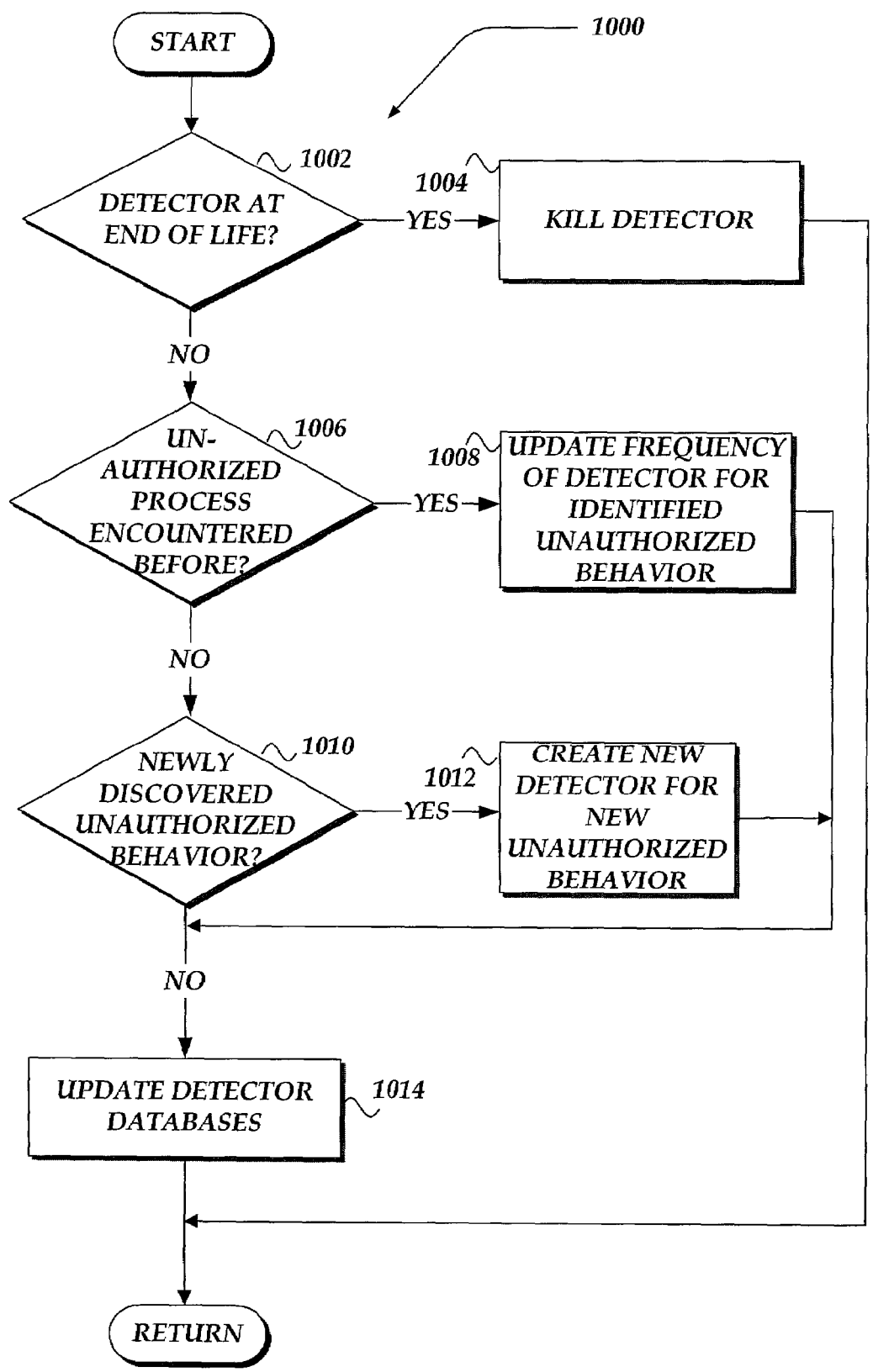
FIG. 10 is a flow diagram illustrating an embodiment of a process of updating detector life-cycle information.

Referring to FIG. 10, a process (described above with reference to block 914) begins at decision block 1002 where a determination is made whether a detector has reached its end of life.

If the determination at decision block 1002 is affirmative, the process control advances to block 1004 where the detector is terminated or killed. Upon completion of block 1004, the process control returns to block 902 (shown in FIG. 9) where substantially the same actions discussed above are performed.

Alternatively, if it is determined at decision 1002 that the detector has not reached an end of its life cycle, the process control advances to decision block 1006, where a determination is made whether the unauthorized client process behavior has been encountered before.

At decision block 1006, if the determination is affirmative, process control is transferred to block 1008. At block 1008, the frequencies of observation of detectors are updated based on the frequencies of identified unauthorized client process behaviors. The frequency tabulations are retained to provide an increased emphasis on more commonly employed or more rapidly spreading unauthorized client process behaviors. The result of block 1008 may be to adjust the transmission frequency of particular detectors or mixes of detectors sent at block 912 in FIG. 9. Upon completion of block 1008, the process control advances to block 1014.

Alternatively, if it is determined at decision block 1006 that the unauthorized client process has not been encountered before, the process control is transferred to decision block 1010, where a determination is made as to whether the unauthorized client behavior is newly discovered to this process.

At decision block 1010, if the determination is affirmative, the process control moves to block 1012. At block 1012, new detectors are created, with accompanying matching rules, to detect future occurrences of this new unauthorized client process behavior. Upon completion of block 1012, the process continues at block 1014.

Alternatively, if it is determined at decision block 1010 that the unauthorized client process behavior is not new or novel, the process control moves to block 1014. As part of the determination that the unauthorized client process behavior is not new or novel, decision block 1010 also determines whether the unauthorized behavior is be substantial enough for the detection of infringements, alterations of electronic media, and the like.

At block 1014, the changes to the frequency of detectors, and information about new detectors are retained in a database. Additionally, at block 1014, the life span information for detectors is updated in the database of detectors. Upon completion of block 1014, the process control returns to block 902 (shown in FIG. 9) where substantially the same actions discussed above are performed.

Sharing Memory Detector Databases

Figure 11:
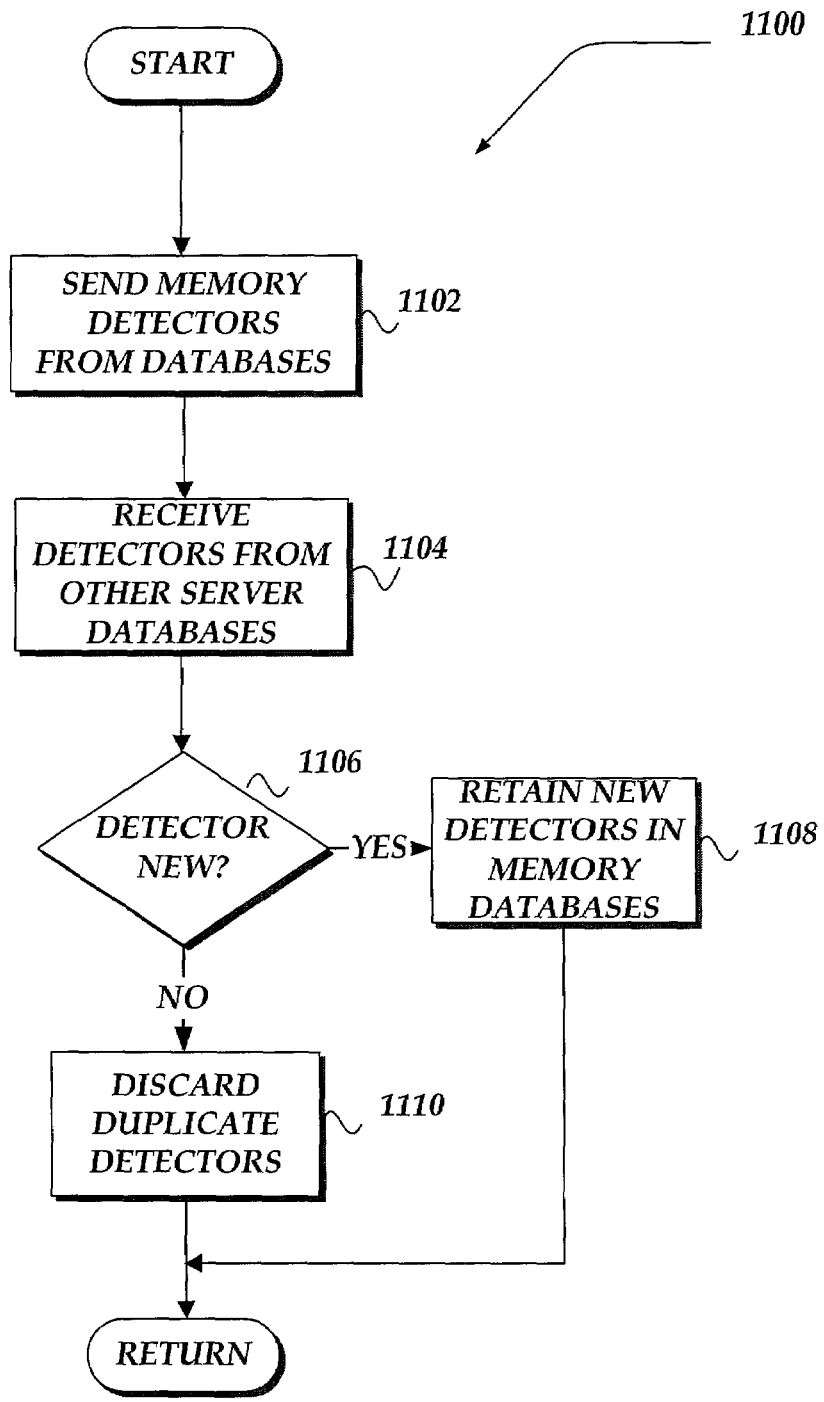
FIG. 11 is a flow diagram illustrating an embodiment of an AEC process to share information about unauthorized client process behaviors to augment detection of apparent widespread unauthorized client process behaviors.

Referring to FIG. 11, a process 1100 begins after a start block, at block 1102, where memory detectors from a set of memory databases are grouped along with the detectors' associated matching rules. The groupings are sent to other servers. After block 1102, process control moves to block 1104.

At block 1104, memory detector groupings from the memory databases of other servers are received. The process control then moves to decision block 1106, where evaluations of the received detector groupings are performed.

If it is determined at decision block 1106 that the received memory detector matches a detector in at least one of the recipient's memory databases, given the recipient's matching rules, and thus is not a new detector, process control moves to block 1110. At block 1110, detectors that are matched, and determined to already exist in some form in one or more of the recipient's databases, are discarded. Discarding duplicate detectors avoids problems that may arise if the duplicate detectors have associated with them different matching algorithm(s) (rules) than the algorithm(s) of the recipient's detectors. Upon completion of block 1110, the process returns to block 912 in FIG. 9.

Alternatively, at decision block 1106, if it is determined that a received memory detector is new to the recipient's memory database, the process control proceeds to block 1108. At block 1108, the new memory detector and its associated matching rules are retained by merging them into the recipient's pre-existing memory database. In this manner, the sharing of detectors between databases of detectors improves the likelihood of detecting unauthorized client process behaviors on a larger scale. Upon completion of block 1108, the process control returns to block 912 in FIG. 9 to perform other actions.

AEC Multi-Server Communications

Figure 12:
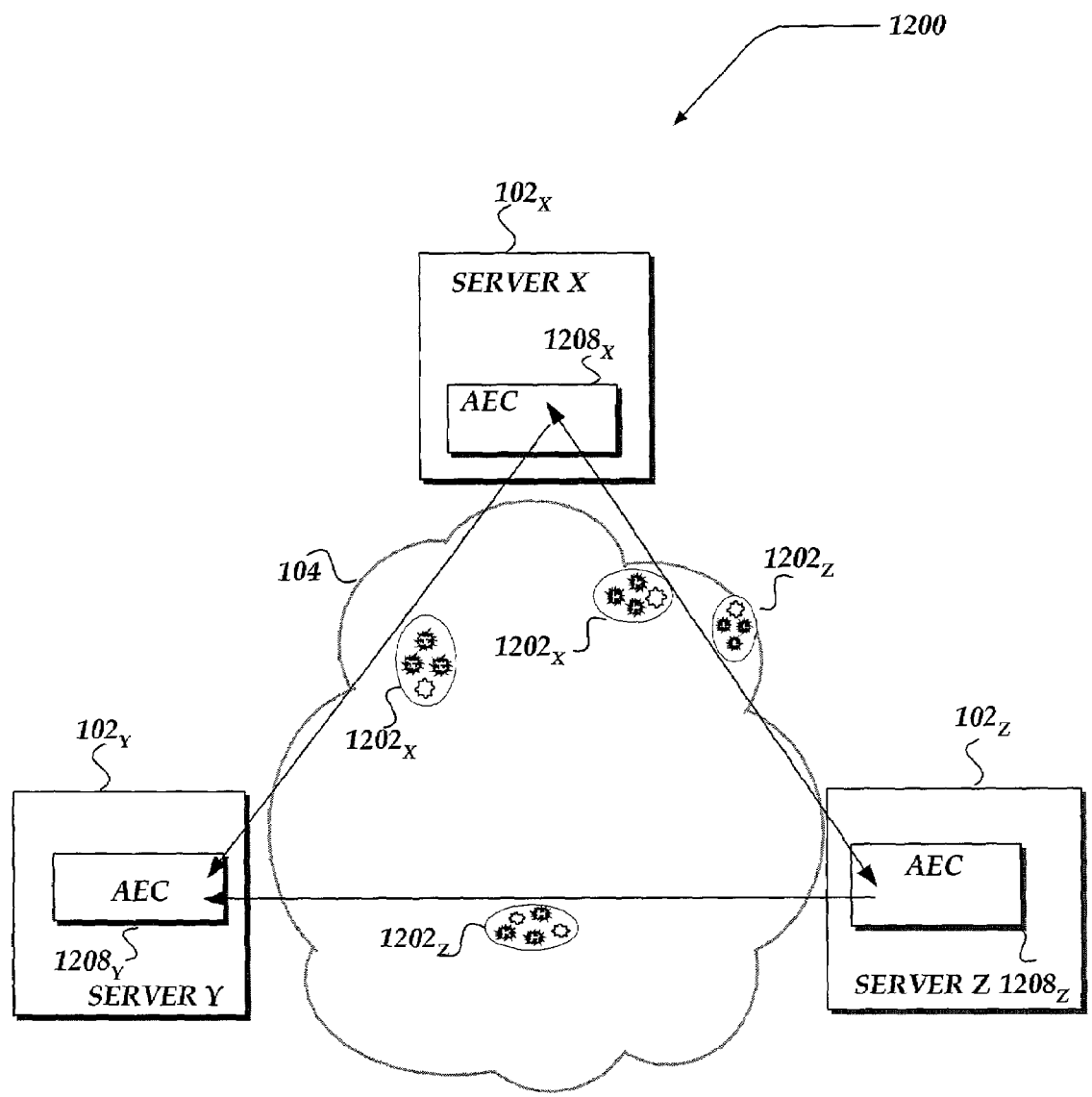
FIG. 12 is a block diagram of an embodiment of a multi-server communication AEC architecture to enable servers coupled to a network to communicate portions of stored memory as memory detector set(s) to other network coupled server(s)

Referring to FIG. 12, a multi-server communications AEC process 1200 includes servers $102_{X-Z}$, and network 104. Each server $102_{X-Z}$ includes an AEC unit $1208_{X-Z}$. Servers $102_{X-Z}$ are each substantially similar to server 102 portrayed with reference to FIG. 2. Although not shown, each server $102_{X-Z}$ may be in communication with a plural number of clients. Furthermore, a network arrangement of servers and clients may range from mostly overlapping the communications with clients to communicating with distinct client sets. Each server $102_{X-Z}$ is coupled to network 104, which provides a communications path between each other server $102_{X-Z}$.

It will be appreciated that the configuration of networks and servers may comprise a vast number of such interconnected networks, servers, and clients (not shown) and other interconnections may be employed without departing from the spirit or scope of the present invention.

In operation, during an update period, server $102_X$ transmits through network 104, memory detector group(s) $1202_X$ to servers $102_Y$ and $102_Z$, while server $102_Z$ transmits through network 104 memory detector group(s) $1202_Z$ to servers $102_X$ and $102_Y$. As shown in the figure, when a server, such as server $102_Y$, currently does not have new memory detector group(s) to share, that server remains a recipient of other servers' memory detector group(s) $1202_{X, Z}$.

Although the present description refers to the sharing of memory groups between servers at substantially the same time, it is understood that other embodiments may be utilized, e.g., each server may share its memory groups at some random update period that is independent of the other servers' update period, without departing from the spirit or scope of the invention.

The establishment of memory detector databases enables servers to increase the speed and thoroughness of detecting previously seen illegal client software configurations. The multi-server communications AEC architecture 1200 scales up this benefit in a more encompassing approach to networks of servers by enabling the sharing of detectors between servers. This embodiment of the present invention therefore provides for the obstruction of the spread of unauthorized software alterations between clients that communicate with other servers on the AEC network.

If server $102_{X-Z}$ on network 104 receives the memory detector groups $1202_{X-Z}$, the server's AEC unit 1208 evaluates them against the recipient's self-database according to the recipient server's matching rule.

Figure 13:
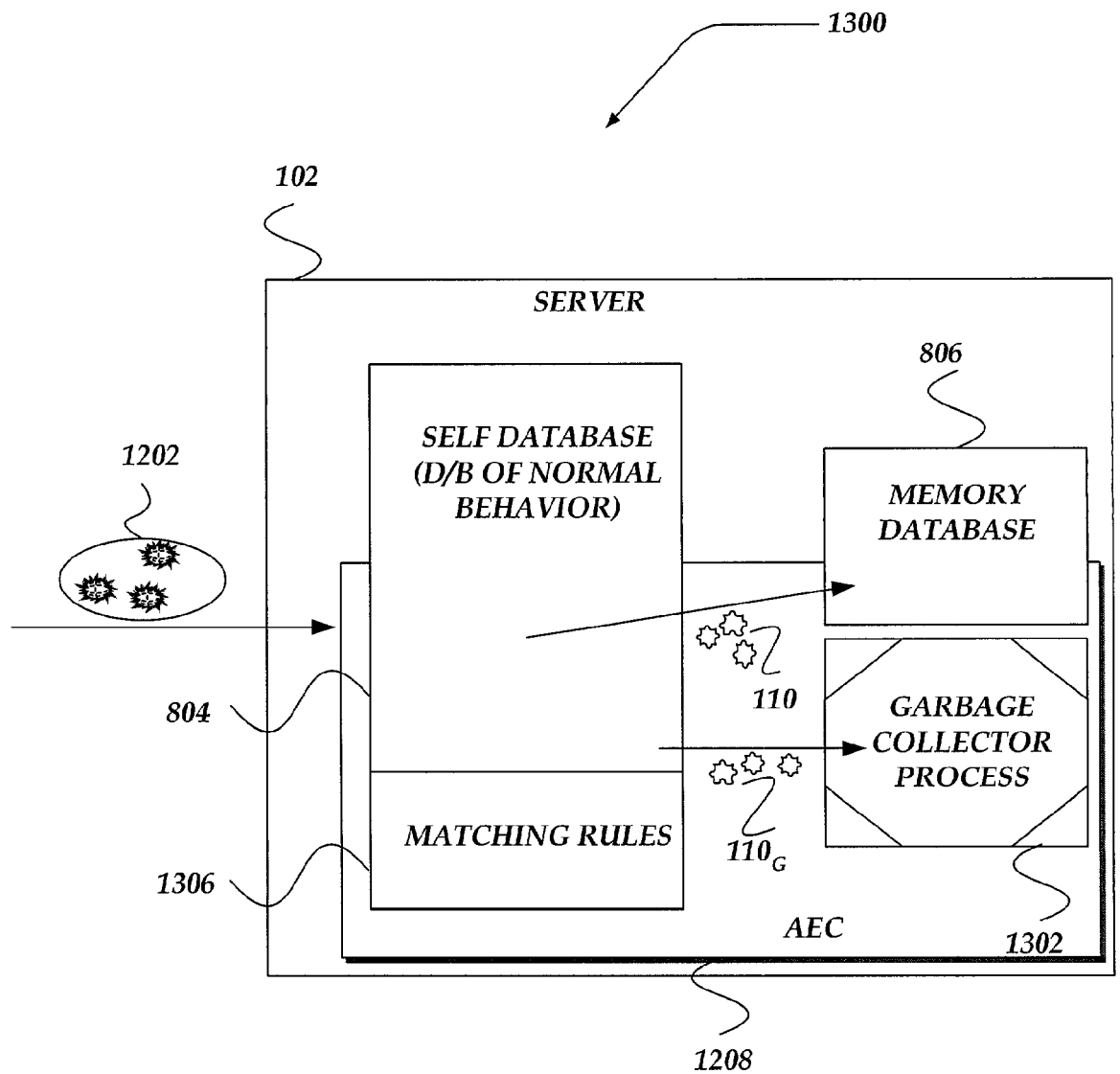
FIG. 13 is a block diagram of an embodiment of an operating environment to evaluate received memory detectors.

Referring now to FIG. 13, a memory detector evaluation system 1300 includes server 102 and memory detector groups 1202. Server 102 is in communication with other servers as shown in FIG. 12, and receives memory detector groups 1202 from those servers as described above.

Server 102 includes AEC unit 1208, which in turn includes a set of matching algorithm(s) (rules) 1306, garbage collector process 1302, and portions of self-fragment database 804 and memory-fragment database 806. Self-fragment database 804 is coupled to and communicates with garbage collector process 1302 and memory-fragment database 806. Moreover, self-database 604 is coupled to a set of matching algorithms (rules) 1306.

In operation, because each server 102 that shares memory detectors may have a different set of matching rules 1306 from other servers 102, an incoming memory detector group 1202 is tested against self-fragment database 804 of the recipient server. If memory detector 110 within memory detector group 1202 is matched to a fragment in the recipient's self database, according to the recipient's set of matching rules 1306, that detector $110_G$ is transmitted to garbage collector process 1302 where detector $110_G$ is discarded. This avoids the likelihood of false positive detections that may arise due to varying matching rules.

If memory detector 110 within received memory detector group 1202 is determined to be unmatched to recipient's self-fragment database 804, memory detector 110 is transmitted to memory-fragment database 806 where it is merged into server's 102 pre-existing set of detectors. The result of this exchange of memory detector groups 1202 between servers enables the scaled-up detection of previously seen illegal software configurations and an improved likelihood of obstructing spreads of illegal software alterations between more clients.

Combined AIS/AEC Embodiment

Figure 14:
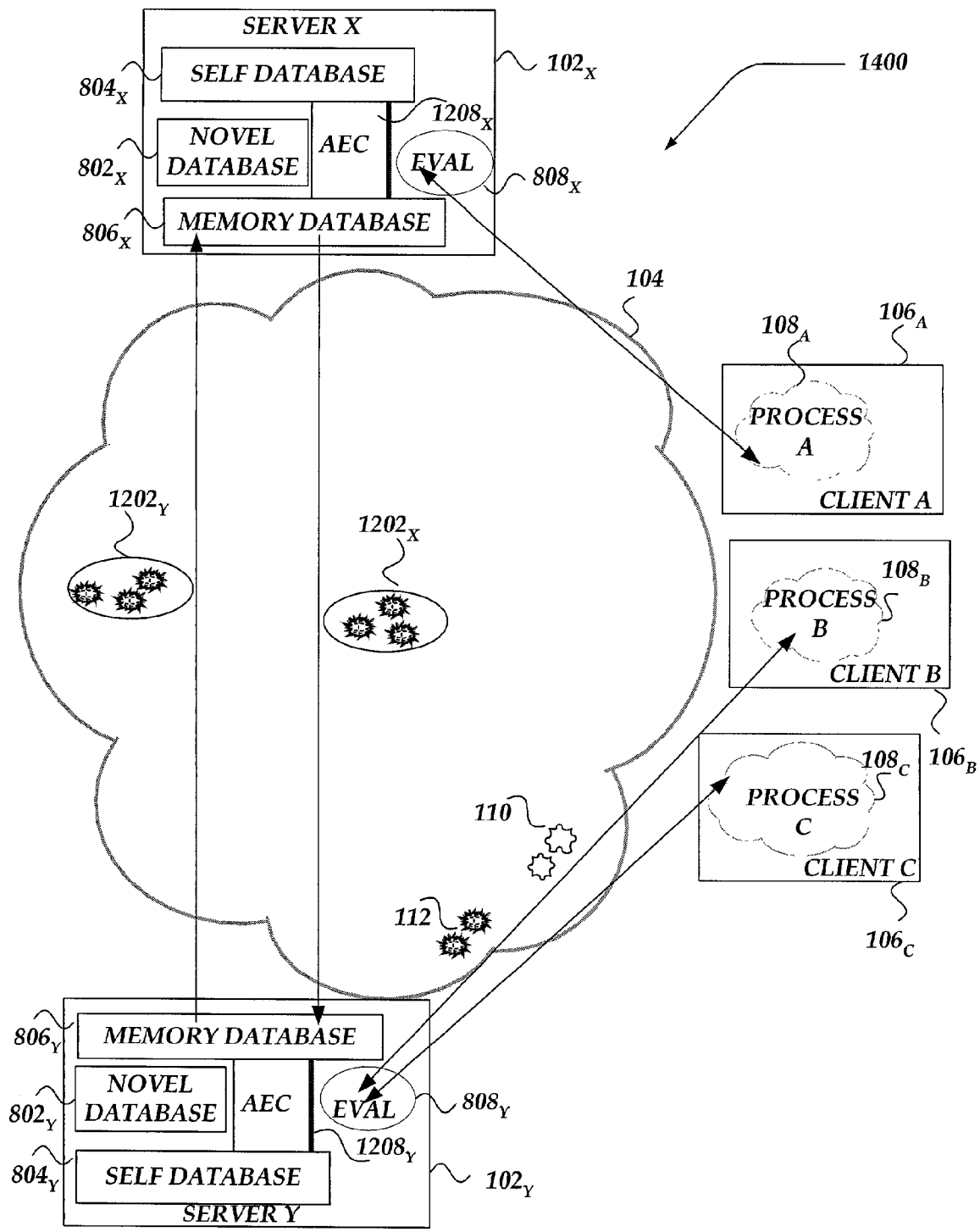
FIG. 14 is a block diagram of an embodiment of an operating environment with an AIS and AEC, in accordance with the present invention.

Referring to FIG. 14, an integrated AIS/AEC system 1400 includes servers $102_{X-Y}$, network 104, and clients $106_{A-C}$. Clients $106_{A-C}$ include software processes $108_{A-C}$, respectively. Server $102_X$ includes novel database $802_X$, self-fragment database $804_X$, memory fragment database $806_X$, evaluator $808_X$, and AEC unit $1208_X$ as described above with reference to FIGS. 8, 12, and 13. Server $102_Y$ includes novel database $802_Y$, self-fragment database $804_Y$, memory fragment database $806_Y$, evaluator $808_Y$, and AEC unit $1208_Y$ as described above with reference to FIGS. 8, 12, and 13.

Servers $102_{X-Y}$ are coupled to network 104 and communicate detectors 110 to the respective clients' software processes $108_{A-C}$. As shown, server $102_Y$ is enabled to communicate with clients $106_{B-C}$, while server $102_X$ is enabled to communicate with client $106_A$.

Clients $106_{A-C}$ are coupled to the network 104 and communicate response(s) 112 to the appropriate server $102_{X\ or\ Y}$ through network 104.

Moreover, servers $102_{X-Y}$ communicate with each other through network 104 to provide sets of memory groups $1202_{X-Y}$ to the other server $102_{X\ or\ Y}$.

The integrated AIS/AEC system 1400 enables adaptation over time by providing for the identification of previously unseen, and unauthorized, software operations within a client software process 108 as "non-self" actions while providing for the sharing throughout the network of servers of previously seen unauthorized software operations.

The AIS component of integrated AIS/AEC system 1400 enables the detection of a broad range of security-compromising software activity as well as the detection of more direct hostile attacks upon the integrity of the system 1400. The employment of self, memory, and novel detectors 110, in a "dialog" between server $102_{X-Y}$ and client $106_{A-C}$ enables detection of not only attempts to subvert software but also attempts to subvert the AIS itself. Moreover, by providing detector deaths, the impact of the AIS components' processor usage may be minimized.

The AEC component of the integrated AIS/AEC system 1400 enables detection of the spread of compromised software as well as the development of data attacks by sharing information between servers $102_{X-Y}$. The employment of databases of detectors ($802_{X-Y}$, $804_{X-Y}$, and $806_{X-Y}$) is directed at enhancing the efficiency of identification of previously encountered subversions, and the sharing of this information between servers provides broader protection among a population of clients $106_{A-C}$.

It will be appreciated that configuration of networks, servers, and clients may comprise a vast number of such interconnected networks, servers, and clients, and other interconnections may be employed without departing from the spirit or scope of the invention. The embodiment portrayed with reference to FIG. 14 enables a less complicated presentation of an embodiment of the present invention than a more intricate network.

OTHER SPECIFIC EMBODIMENTS OF THE INVENTION

In light of the present disclosure, the present invention has identified other specific embodiments that may be directed towards improving the operational efficiency or speed with which the invention identifies a security-compromising client configuration.

One such embodiment significantly increases the efficiency of the present invention by maximizing the amount of non-self space covered by a fixed number of non-self detectors. Typically, to detect abnormal behavior, non-self detectors may need to be generated and compared with logged file system calls to determine the presence of potential matches. For a fixed detector length, the stringency of matching is determined by the stringency of the matching rules. For example, an illustrative detector length of say eight system calls, a matching rule that would require two consecutive file system calls to be substantially identical to the logged system call fragment would be less stringent than a matching rule that requires seven of the eight consecutive system calls to match. Thus, a less stringent detector-matching rule would match a larger number of logged sequences, and consequently cover a larger area of non-self space. By cyclically generating detectors with ever-increasing stringency of matching rules, the inventors have identified, and the present invention specifically includes, that the non-self space may be covered more efficiently. That is, instead of all the detectors employing the same matching rule, and thereby covering the non-self space in equally sized partitions, the present invention takes advantage of the heterogeneity of non-self space. In this approach, different detectors with different matching rules, allow certain larger areas of non-self space to be covered with a relatively small number of low-stringency-rule detectors, and certain small partitions or crevices of non-self space to be covered with higher-stringency-rule detectors.

In yet another such embodiment of the present invention, the speed is increased for evaluating the presence of a match between the detector and log fragment, by employing a comparison algorithm such as the Rabin-Karp algorithm and the like. Algorithms such as the Rabin-Karp employ prime numbers and sliding windows on the system calls to considerably shorten the amount of time required to evaluate string matches.

In yet another such embodiment of the present invention, greater efficiency is provided by developing the matching rules to minimize the number of comparisons necessary to identify a security-compromising client configuration. In this embodiment, an adaptive rule-learning algorithm is employed. Specific matching rules are evolved through training on the self-data, and these rules are then employed to more rapidly identify unauthorized client configurations. More general rules may be extracted from analysis of the self-database and directed at covering a larger portion of the search space by generating rules that match key elements of recurring patterns of system calls, rather than specific system calls. As described above, the '*' token provides an example of the generation of a more generalized rule.

Such generalized rules may be developed to describe larger parts of the non-self space, to cover as large a portion of the space being searched as feasible with the least number of rules, thus improving the efficiency of the detector comparisons.

Embodiments of the present invention include program operations stored on a machine readable medium. A machine readable storage medium includes any mechanism that provides (i.e. stores and/or transmits) information such as computer readable instructions, data structures, program modules, or other data; in a form readable by a machine (e.g. a computer). For example, a machine readable medium includes read only memory (ROM), random access memory (RAM), magnetic storage media, optical storage media, flash memory devices and other solid state electronic memory devices, electrical, optical, acoustical or other propagated signals (e.g. carrier waves, infrared signals, digital signals, etc.) etc.

In the foregoing specification, the present invention has been described with reference to specific exemplary embodiments thereof. It will however be evident that various modifications and changes may be made thereto without departing from the broader spirit and scope of the invention as set forth in the appended claims. The specification and drawings including specific embodiments described are accordingly, to be regarded in an illustrative rather than a restrictive sense. Many embodiments of the invention can be made without departing from the spirit and scope of the invention. The invention resides in the claims hereinafter appended.

We claim:

1. A method of protecting machine readable media from unauthorized storage or copying, comprising:
   sending a detector to a client process, wherein the detector comprises a sequence of different types of computer system calls;
   receiving, at a server, a response to the detector from the client process;
   detecting, by the server, a presence of an unauthorized software behavior on the client based upon a comparison between the response and the detector according to a matching rule that is associated with the detector sent; and
   updating a database of detectors for a previously unseen and unauthorized behavior of the process based in part on the response, such that the database of detectors evolves over time.

2. The method as in claim 1, wherein the sent detector includes at least one of a self-detector, a memory detector, and a novel detector, and wherein:
   the self-detector comprises a sequence of different types of system calls detectable in a normal execution of a process;
   the memory detector comprises a sequence of different types of system calls that is associated with a known unauthorized process alteration; and
   the novel detector comprises a sequence of different types of system calls that has not been previously detected in an execution of the process.

3. The method as in claim 1, wherein the sent detector further comprises detecting the presence of an unauthorized substantially simultaneously executing client process.

4. The method as in claim 1, wherein the sending of the detector further comprises varying a length of the sequence of computer system calls within the detector such that the meaning of the detector is obscured.

5. The method as in claim 1, wherein the sending of the detector further comprises encoding numerically the detector such that the meaning of the detector is obscured.

6. The method as in claim 1, wherein the matching rule includes a criterion for each field in the detector that is to be matched before a match is validated, wherein each field includes a sequence of at least one computer system calls.

7. The method as in claim 1, further including sending the detector to detect previously unseen and unauthorized behavior to another client process.

8. The method as in claim 1, further including:
   exchanging sets of memory detectors between the server and another server during an update period, wherein each memory detector comprises a sequence of different types of system calls that is associated with a known unauthorized process alteration;
   evaluating the received set of memory detectors against each server's self database of detectors and a set of matching rules;
   discarding memory detectors in the received set of memory detectors that match another detector in each server's self database of detectors, wherein a false positive detection is minimized; and
   merging each new retained memory detector from the received set of memory detectors with each server's memory database of detectors, wherein the exchange of the sets of memory detectors between each server obstructs the spread of unauthorized copying and corruption of electronic media.

9. A method for obstructing unauthorized copying and corruption of media between clients that communicate over a network of servers, comprising:
   exchanging a set of memory detectors between servers during an update period, wherein each memory detector comprises a sequence of different types of system calls that is associated with a known unauthorized process alteration;
   evaluating each received set of memory detectors against each server's self database and a set of matching rules;
   discarding each detector in the received set of detectors that match another detector in each server's self database; and
   merging a new retained detector from each received set of detectors with each server's memory database, wherein the exchanging of the set of memory detectors prevents unauthorized copying and corruption of media.

10. The method as in claim 9, wherein each detector within the set of memory detectors has a life span wherein the detector is active on a client during the life span and becomes inactive when the life span is exceeded.

11. The method as in claim 9, wherein the set of detectors enable the detection of the presence of an unauthorized substantially simultaneously executing client process.

12. The method as in claim 9, wherein the exchanging the set of memory detectors further includes varying a sequence length of a computer system call within each detector such that each detector is obscured.

13. The method as in claim 9, wherein the exchanging the set of detectors includes encoding numerically the detector such that the meaning of the detector is obscured.

14. The method as in claim 9, wherein the matching rule includes at least one criterion for each field in each detector that is to be matched before a match is validated, and wherein each field includes a sequence of at least one computer system calls.

15. A method of providing detection of machine-readable media from an unauthorized usage, the method comprising:
   sending by a server a series of behavioral questions for a process residing on a clients, wherein the series of behavioral questions comprise a series of different types of system calls and an identifier specifying media associated with the system calls;
   receiving at the server a response from the client;
   evaluating the response from the process to the series of behavioral questions;
   detecting an unauthorized behavior of the process based on the evaluating; and
   communicating the detection of the unauthorized behavior of the process among a plurality of other servers, so that the plurality of other servers are enabled to update their series of behavioral questions based in part on the detected unauthorized behavior.

16. A server to protect media from unauthorized usage, the system comprising:
   a transceivers to send and receive data over the network; and
   a program to perform actions when executed that include:
      sending a detector to a client, the detector comprising a sequence of different types of system calls, and is associated with a life span that when exceeded inactivates the use of the detector for detecting an unauthorized process;
      receiving a response to the detector from the client,
      detecting a presence of the unauthorized process on the client based on the response and a matching rule associated with the detector, and updating a database of memory detectors for a previously undetected and unauthorized process on the client such that the database of memory detectors evolves over time.

17. The system as in claim 16 further including employing the client to access the media.

18. The system as in claim 16, wherein the sending of the detector includes adjusting the frequency of a class of detectors sent in response to changes in responses from each client, such that the class of detectors includes at least one of a self-detector, a memory detector, and a novel detector.

19. The system as in claim 16, wherein the updating further includes eliminating detectors in the database that exceed the predetermined detector life span.

20. The system as in claim 16, wherein the matching rule includes at least one criterion for a field in the detector to be matched before a match is validated, and wherein the field includes a sequence of at least one computer system calls.

21. A system to protect media from unauthorized usage, the system comprising:
   a server to send media to a client; and
   a program to perform actions when executed that include:
      sending a detector to the client;
      receiving a response to the detector from the client;
      detecting a presence of an unauthorized process on the client based on the response and a matching rule associated with the detector, wherein the detecting includes executing a Rabin-Karp algorithm of prime numbers and a sliding window across the response and the detector; and
      updating a database of memory detectors for a previously undetected and unauthorized process on the client such that the database of memory detectors evolves over time.

22. A computer readable medium having stored thereon a data structure to provide a detector pattern for use in data integrity of machine-readable media, the data structure comprising:
   a plurality of data fields associated with a matching rule to validate a match of the plurality of data fields from a response to the data structure, and wherein at least one data field in the plurality of data fields indicates a media associated with the detector pattern and each of the remaining data fields in the plurality of data fields comprises different types of computer system calls.

23. A machine readable medium that provides instructions which, when executed by at least one processor, cause said processor to perform operations comprising:
   sending a plurality of different detectors to a client process, wherein each detector within the plurality of detectors comprise a different sequence of different types of system calls;
   receiving a response to each of the plurality of different detectors from the client process;
   detecting a presence of an unauthorized behavior on the client based upon the response and a matching rule that is associated with the plurality of different detectors sent; and
   updating a database of memory detectors for a previously unseen and unauthorized behavior of the client process such that the memory database evolves over time, and wherein each memory detector comprises a sequence of different types of system calls that is associated with an unauthorized client process alteration.

24. The medium as in claim 23, wherein the detector further includes at least one of a self-detector, a memory detector, and a novel detector.

25. The medium as in claim 23, wherein the detector detects the presence of an unauthorized substantially simultaneously executing client process.

26. The medium as in claim 23, wherein the sending of the detector further includes varying a sequence length of computer system calls within the detector such that the meaning of the detector is obscured.

27. The medium as in claim 23, wherein the sending of the detector further includes encoding numerically the detector such that the meaning of the detector is obscured.

28. The method of claim 1, wherein associated with the detector is a life span defining a length of time that the detector is considered active on the client device, and wherein, when the life span for the detector is exceeded, the detector is inactivated.

* * * * *